UNITED STATES PATENT OFFICE.

WILLIAM A. McKENTYRE, OF CHICAGO, ILLINOIS, ASSIGNOR OF ONE-FOURTH HIS RIGHT TO JAMES R. BLANEY, OF SAME PLACE.

IMPROVEMENT IN COMPOSITIONS FOR FILLING RESPIRATORS.

Specification forming part of Letters Patent No. 179,664, dated July 11, 1876; application filed October 14, 1875.

*To all whom it may concern:*

Be it known that I, WM. A. McKENTYRE, of Chicago, in the county of Cook and State of Illinois, have invented a new and useful compound, which is hereinafter fully described.

The invention relates to that class of compounds used for the purpose of permitting the respiration of an atmosphere otherwise irrespirable, because of smoke, or injurious gases or vapors it may contain; and it consists in a composition formed by mixing charcoal, glycerine, and water with a suitable known caustic alkali or alkaline earth.

To prepare the compound, take about equal quantities of freshly-burnt charcoal, glycerine, and a caustic alkali (soda or potash, for example) or a caustic alkaline earth (as lime). For convenience, first mix intimately the charcoal and alkali, each being finely pulverized; then add the glycerine and a sufficient quantity of water to form the whole into a thin paste.

Caustic alkali and an alkaline earth may be used together. The caustic alkalies will, in some cases, be somewhat more efficient than an alkaline earth, because they have a greater affinity for the acids found in deleterious gases or vapors; but the caustic nature of these alkalies renders their use sometimes inconvenient.

In use, the composition is to be placed in any suitable vessel, through which the air to be inspired is drawn, and can conveniently be used in connection with some fibrous material saturated or filled with the compound. The caustic alkali or alkaline earth will combine with and remove acid gases or vapors, and the remaining ingredients will absorb or dissolve other deleterious gases or vapors. At the same time the glycerine will arrest the passage of any solid particles—smoke, for example—and the air which passes through will be rendered fit for respiration. The glycerine also serves the purpose of keeping the mixture moist, so that it will remain in an effective condition for a considerable period of time.

I have found that this compound is very useful for firemen, its use enabling them to remain a long time in rooms filled with smoke or deleterious gases or vapors, and where they could not breathe without some such aid.

It will be found useful for many other purposes, as in mines, wells, and tunnels.

The proportions mentioned can be somewhat varied. When a caustic alkali and an alkaline earth are both used, the quantity of the two together should be about equal to one-fourth of the whole mixture.

What I claim as new, and desire to secure by Letters Patent, is as follows:

A compound consisting of charcoal, glycerine, water, and a caustic alkali or an alkaline earth, or both together, substantially as and for the purposes specified.

WM. A. McKENTYRE.

Witnesses:
JAS. R. BLANEY,
D. W. GRAVES.